United States Patent [19]

MacDonald et al.

[11] Patent Number: 4,954,912
[45] Date of Patent: Sep. 4, 1990

[54] IMAGE GENERATING APPARATUS

[75] Inventors: Lindsay MacDonald, Bedfordshire; Clive Mayne; Reza P. Rassool, both of London, all of England

[73] Assignee: Crosfield Electronics Limited, London, England

[21] Appl. No.: 359,299

[22] Filed: May 31, 1989

[30] Foreign Application Priority Data

May 31, 1988 [GB] United Kingdom ............... 8812891

[51] Int. Cl.⁵ ............................................. H04N 1/40
[52] U.S. Cl. .................................... 358/448; 358/452; 358/75
[58] Field of Search ............... 358/443, 444, 448, 452, 358/461, 75, 80, 78

[56] References Cited

U.S. PATENT DOCUMENTS 4,477,833 10/1984 Clark et al. ........................... 358/78
4,496,968 1/1985 Pugsley ................................. 358/80
4,639,769 1/1987 Fleisher et al. ....................... 358/80
4,845,565 7/1989 Macheboeuf ........................ 358/183

FOREIGN PATENT DOCUMENTS 0089174 9/1983 European Pat. Off. .
0138324 4/1985 European Pat. Off. .
0240417 10/1987 European Pat. Off. .
2113950 8/1983 United Kingdom .

Primary Examiner—Edward L. Coles, Sr.
Assistant Examiner—Jerome G. Grant, II
Attorney, Agent, or Firm—Sughrue, Mion, Zinn, Macpeak & Seas

[57] ABSTRACT

Apparatus for generating a composite image from a plurality of subsidiary images comprises first stores for storing signals representing at least two subsidiary images. Second stores store at least two arrays of mask data, each array having a mask pixel corresponding to each pixel of the composite image. A control system is responsive to each array of mask data to generate for the pixels of the composite image signals defining a weighted sum of the subsidiary images.

7 Claims, 4 Drawing Sheets

IMAGE GENERATING APPARATUS

FIELD OF THE INVENTION

The invention relates to apparatus for generating a composite image from a plurality of subsidiary images.

DESCRIPTION OF THE PRIOR ART

It is a common requirement in video display systems to compose two or more images together into a resultant image, forming either a montage of pieces of the component images or a smoothly blended composite. In television broadcast systems, for example, the composition of two images by the "blue matte" technique is well known, where the blue background areas of one image are detected by the processing hardware and replaced by corresponding areas of a second image. Also it is well known to perform montage, dissolve and animation effects on television broadcast systems, as seen in television advertisements and title sequences. Such systems, however, generally rely on analogue mixing circuitry for real-time operation, or a sequence of pre-computed images replayed at the broadcast rate of 25 frames per second. Where real-time digital mixing is provided, the effects are limited to image insets into the main picture. An example of a television mixing system is described in EP-A-0240417.

In the field of colour printing it is now common for the pixels of an image to be represented digitally and for that digital representation to be retouched or otherwise modified, for example enlarged, contracted or rotated, by viewing a representation of the image on a monitor and then modifying the digital data until the desired final image is obtained. Several such images may be combined together by instruction from the operator to achieve a digital representation of a composite page, suitable for publication in a magazine or coloured brochure. An example of equipment for retouching and page composition is our Studio 800 system.

In the conventional image display system of a graphic arts workstation, the image is displayed as an array of pixels on a high-resolution video monitor. Typically the display is organised as 1024 lines of 1024 pixels each, repeated at a rate of 60 frames per second to minimise flicker. The image is held as digital values in a frame store, with one or three components per pixel, depending upon whether the image is monochrome or coloured.

It is well known to have several frame stores in a video display system. Such an arrangement allows, for example, one store to be modified slowly while the other is being displayed, then switched for the next update (a procedure known as "double buffering"). Also two stores may be used as source and destination for an image processor performing a modifying function upon the image data. Video pixel processors have also been designed to allow the real-time mixing of pixel data from two frame stores under the control of a third mask store, as disclosed in US-A-4,617,592 entitled "Video Retouching System" and GB-A-2113950.

In graphic arts applications it is often necessary to keep one part of an image stationary on the display while another part is updated or moved continuously until the required effect is achieved. An example is in page planning, where the page area is displayed unchanging while an image is interactively positioned inside an area of interest defined by the operator, for example, a rectangular box, determined by the design of the overall page layout. Another example is in image colour correction, where one area of an image is to be modified to match the colour of another, unmodified, area of the image or page.

Typically, the current version of the page is held in one frame store, while the active image is held in a second frame store, with a mask defining the area of interest held in a third frame store, in one-to-one pixel correspondence with the other two. For a simple montage the mask store would normally contain 1-bit pixels, used to render the one class of page pixels receptive to replacement by the corresponding image pixels and the other class not receptive to replacement. For more complex anti-aliased blending into the page of text or linework, as well as super-imposition of two images, the mask store would contain multi-bit (for example 8-bit) pixels, enabling soft edges and gradual density changes to be obtained.

The performance objective of any interactive image modification system is to allow the operator to achieve the desired blending of the image into the displayed page without perceptible delay. Frequently the operator will be required to adjust a control device, generating a succession of modified page/image combinations on the display screen until the desired degree of modification is achieved. An example is the adjustment of angle for the rotation of an image displayed within a static masked region of a page. Perceptible delays between successive modifications of the displayed page will lead to a significant reduction in the cognitive efficiency of the operator.

In practice, for a video display system the shortest update time necessary is one video frame period, namely 16.7 milliseconds at a video refresh rate of 60 frames per second. The minimum update time of 16.7 milliseconds, however, imposes severe speed requirements upon the processor which performs the blending of the image and page in the frame stores. In the worst case, where all one million pixels in the frame store must be modified, an update rate of about 60 million pixels per second is needed. When the complexity of sophisticated blending algorithms is taken into account, the necessary processor performance becomes almost impossible to achieve at a realistic price with current technology. Thus conventional video mixing systems have tended to use dedicated hardware operating on the output video data stream to the display, in order to achieve a "real time" blending of images. They are generally limited, however, in the number of images that can be mixed simultaneously (normally only two), in the order in which the mixing can be performed, and in the range of mixing effects that can be achieved.

SUMMARY OF THE INVENTION

In accordance with the present invention, we have now devised apparatus for generating a composite image from a plurality of subsidiary images, the apparatus comprising first storage means for storing signals representing at least two subsidiary images; second storage means for storing at least two arrays of mask data, each array having a mask pixel corresponding to each pixel of the composite image; and control means responsive to each array of mask data to generate for the pixels of the composite image signals defining a weighted sum of the subsidiary images.

This invention leads to a much more flexible system, for example a video mixing system where the composite image can be displayed in real time on a monitor. Each array of mask pixels is coterminous with the area of the composite image, and different mask arrays can be switched to control successive mixing stages. This enables a large number of new modes of composite image generation to be achieved. For example, in one application, two subsidiary images can be scrolled respectively above and below a stationary third image within the composite image. This was previously not possible. Other applications will be described below. In addition, the order of mixing can be altered to give different effects without modifying data in either the mask or image stores. The mixing hardware, such as look-up tables, multiplexers, adder, normaliser allows a wide range of mixing effects to be achieved. All mixing is non-destructive, as in the preferred examples different display effects can be achieved only by multiplexer switching and reloading of coefficient look-up tables, without modifying data in mask or image stores.

The subsidiary images may comprise an image, a current version of a composite page, text or linework, a tint, a grid pattern, a computer-generated picture, etc. The subsidiary images may have been generated initially by scanning an original photographic transparency or by capture of a frame from a television sequence. The exact form of the subsidiary image to be inserted into the composite image will be defined by the operator in a conventional manner by viewing a display of the subsidiary image and adjusting its form by cropping, outlining enlarging, contracting and the like.

Conveniently, the control means includes a number of image mixing stages connected in cascade, each of which is associated with a mask data array, each stage downstream of the first combining two input pixel signals, one from the output of the previous stage and the other from a subsidiary image in the first storage means.

For greatest flexibility of operation, the image mixer system is connected to each subsidiary image by a multiplexer which has one input port for each subsidiary image and one output port for each mixing stage plus one additional output port to feed the first mixing stage. The multiplexer allows each output port to be coupled with a selected input port thereby routing pixel data from the selected subsidiary images to the successive mixing stages.

Preferably, each mixing stage includes a weighting circuit comprising a number of look-up tables which are addressed by the mask data to generate mask weighting coefficients. This enables effects such as graded mixing of two images and vignettes to be achieved. The control means may also include a multiplexer having a number of input ports, one for each array of mask data, and which is controllable to allow any of the mask data arrays to be selected to address the look-up tables in each weighting circuit.

In a preferred arrangement each weighting circuit comprises two look-up tables which hold weighting coefficients, addressed by the mask pixel data, the control means being arranged to multiply each input image pixel value by the respective weighting coefficient, to add the products together, and to normalise the resultant sum to give a composite output pixel value.

In some arrangements, one or more of the subsidiary images may comprise a tint defined by a respective look-up table which is addressed by a selected set of control signals. Such control signals may be derived from the mask store, or image store, or elsewhere.

Although in the preferred arrangement two mask data arrays and two mixing stages are provided, in principle the invention is applicable to more than two mask data arrays and corresponding mixing stages.

Of course the first and second storage means for subsidiary images could be provided by separate memories or a common memory. Similarly, the mask and image stores could be provided by separate memories or by separately allocated sections of a common memory.

In an important series of applications of the invention, one of the subsidiary images is a function of the other. This is particularly suitable for achieving unsharp masking effects in a non-destructive manner. The conventional unsharp masking algorithm is:

$$S' = S + K(S - U) \quad (1)$$

where
S' = modified pixel value,
S = original pixel value,
U = average in neighbourhood of pixel, and
K is a constant defining the degree of unsharp masking which is applied.

In this case, one of the subsidiary images can define for each pixel the value S−U and this is then applied to apparatus according to the invention in which the control means generates the weighted sum defined in equation 1 above.

Where the apparatus includes two mixing stages, even more flexibility is possible by selectively varying the amount of unsharp masking according to the position of the pixel within the image. This can be achieved by use of the second mixing stage as will be explained in more detail below.

In addition to unsharp masking, other algorithms can be applied in a non-destructive manner where one of the subsidiary images comprises a function of the other. These functions can include a simple average of neighbouring pixels within a window, complex statistical functions of neighbouring pixels such as a Kirch operator, edge cross-section, entropy, gradient, Laplacian and the like which are all useful for edge extraction; or the function may be colour dependent as is known to be useful for colour selective masking and luminance retouching.

BRIEF DESCRIPTION OF THE DRAWINGS

Two examples of video mixing systems incorporating apparatus according to the invention will now be described with reference to the accompanying drawings, in which.

DETAILED DESCRIPTION OF THE EMBODIMENTS

Figure 1:
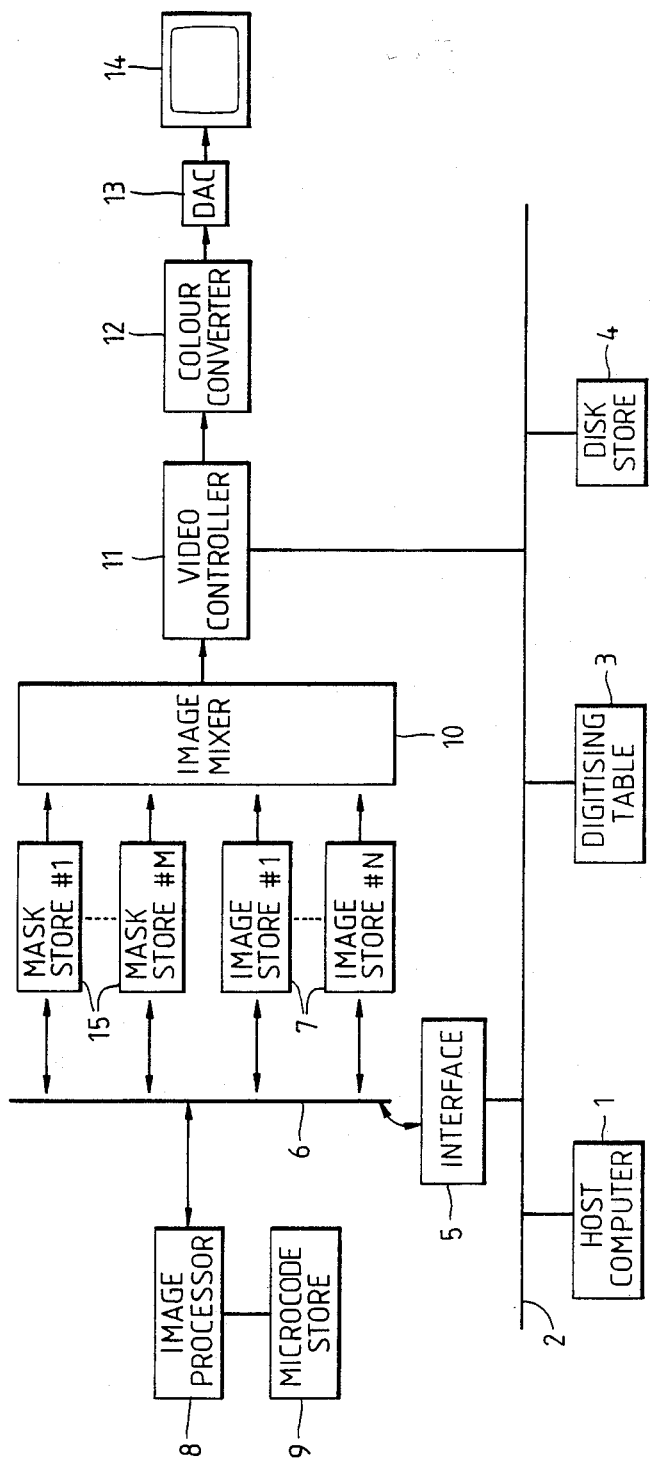
FIG. 1 is a block circuit diagram of one example of the image processing system architecture.

The image processing system architecture shown in FIG. 1 comprises a host computer 1 coupled to an interconnect bus 2. A digitising table 3 and a disc store 4 are also connected to the bus 2. The bus 2 is connected via an interface circuit 5 with an image bus 6. The image bus 6 is connected to an image processor 8 controlled by microcode instructions from a store 9. In addition, the bus 6 is connected to a number N of image stores 7 and a number M of mask stores 15.

The image and mask stores 7, 15 are connected to the input ports of an image mixer circuit 10 which is also connected with the bus 2. The output from the mixer circuit 10 (to be described in more detail below) is connected to a video controller circuit 11 which is coupled with the bus 2. The output of the video controller 11 is coupled to a colour converter 12 which converts digital data defining an image to be displayed from a processing colour format (for example cyan, magenta, yellow, black) to a display colour format (such as red, green, and blue). The signals from the colour converter 12 are fed to a digital to analogue converter 13 and control the display on a monitor 14.

In use, an operator controls the system from the digitising table 3 via the host computer 1. When the operator wishes to mix certain images stored on the disk store 4, he causes the images to be downloaded into respective image stores 7 and causes the mask stores 15 to be loaded with appropriate mask data. Typically, one of the image stores 7 would be used to hold the progressive states of the composite page. Selected images from the image stores 7 are then combined under the control of the mask data in the image mixer 10 and a resultant combined or mixed image is then displayed on the monitor 14.

Figure 2:
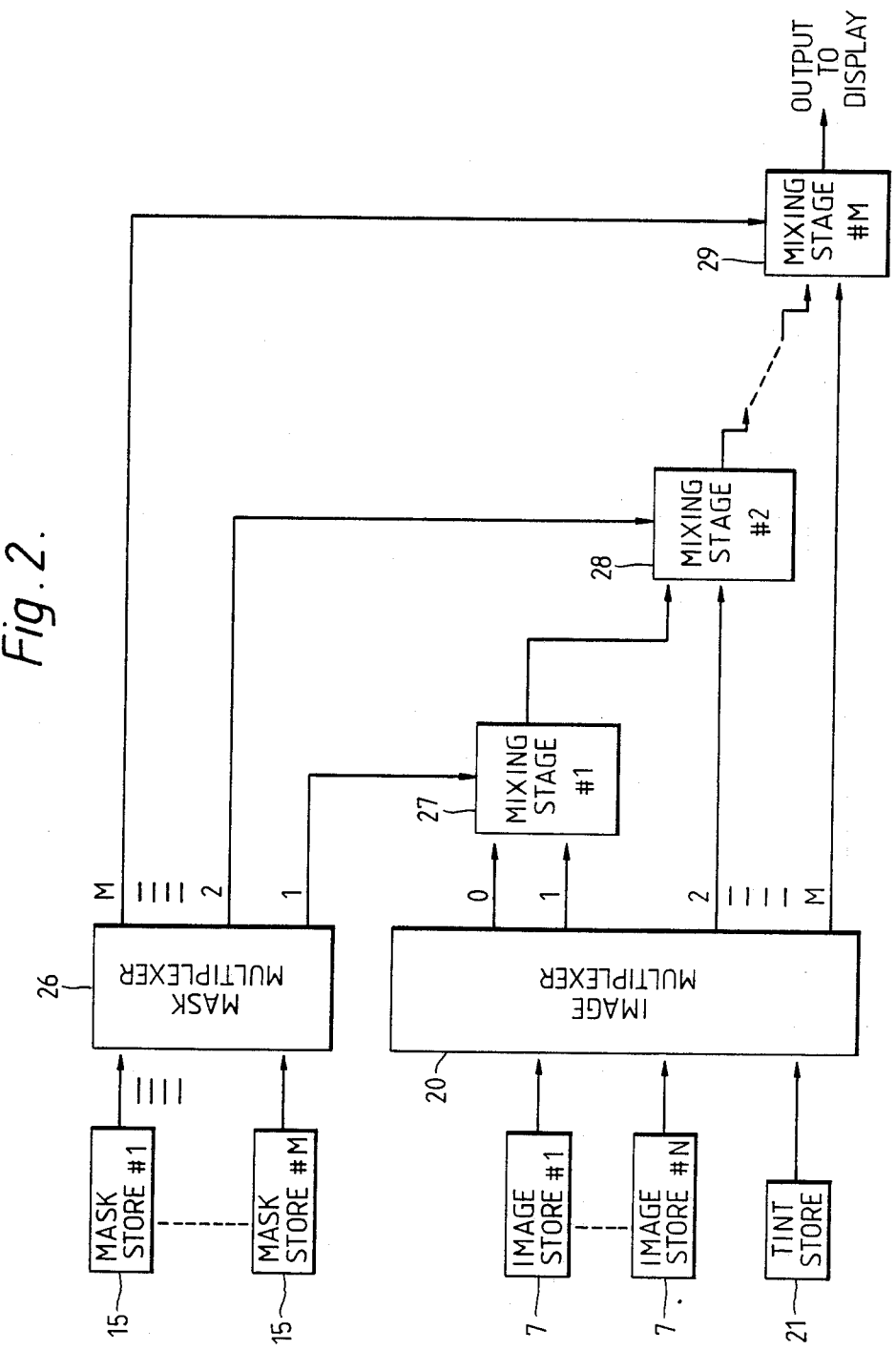
FIG. 2 is a block diagram of the image mixer of FIG. 1.

FIG. 2 illustrates the overall design of the image mixer 10 which comprises an image multiplexer 20 having N+1 input ports connected with the N image stores 7 and a tint store 21. The image mixer also has a mask multiplexer 26 having M input ports connected with respective mask stores 15. In addition, a number M of mixing stages 27, 28, 29 is provided, one for each mask store 15. Each mixing stage combines pixel data from the previous stage with pixel data from the associated output port of the image multiplexer 20, while the first mixing stage 27 combines pixel data from two of the output ports of the image multiplexer 20. The mixing process in each mixing stage is controlled by mask data from the respective output port of the mask multiplexer 26.

The image mixer circuit shown in FIG. 2 can combine multiple monochrome images into a composite. For full colour images in RGB monitor colour format, the entire circuit is replicated three times, for the red, green and blue components respectively. For full colour images in CMYK print colour format, the entire circuit is replicated four times, for the cyan, magenta, yellow and black components respectively.

Figure 3:
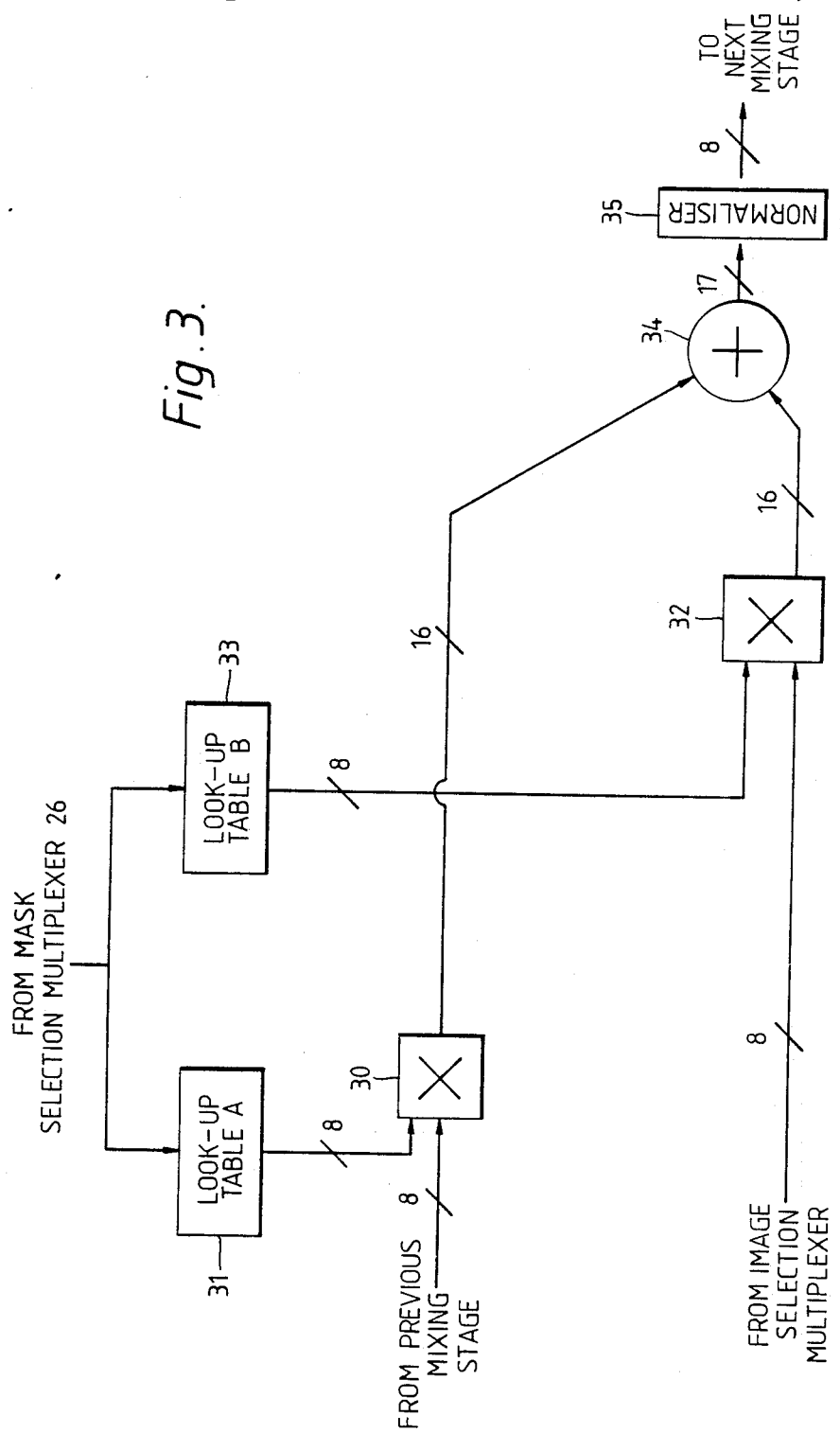
FIG. 3 is a block diagram of an image mixing stage of FIG. 2.

FIG. 3 illustrates the construction of one of the mixing stages 27-29 in more detail. The mixing stage comprises a pair of look-up tables 31, 33 connected to receive as address information mask data from one of the output ports of the mask multiplexer 26. Each table 31, 33 stores a set of eight bit weighting coefficients which are applied to respective multiplier circuits 30, 32. The other input to the multiplier circuit 30 is provided from the output of the previous mixing stage or, in the case of the first mixing stage 27, from the first output port of the image multiplexer 20. The other input to the multiplier 32 is connected directly to the corresponding output port of the image multiplexer 20. The sixteen bit outputs from the multipliers 30, 32 are fed to an adder circuit 34 whose 17-bit output is fed to a normalising circuit 35 which by shifting and rounding the data generates a normalised eight bit output, to be conveyed to the next mixing stage.

Each mask store 15 holds an array of mask pixels in one-to-one correspondence with the final, composite image. Each mask pixel value is used to address a look-up table 31, 33 in the corresponding mixing stage. These tables 31,33 will have been loaded with predetermined weighting coefficients so that for each pixel, the relative proportions of the intermediate image from the previous mixing stage and a new image to be combined with that intermediate image are determined by the look-up tables 31, 33. This will be described in more detail below in connection with FIG. 4.

Figure 4:
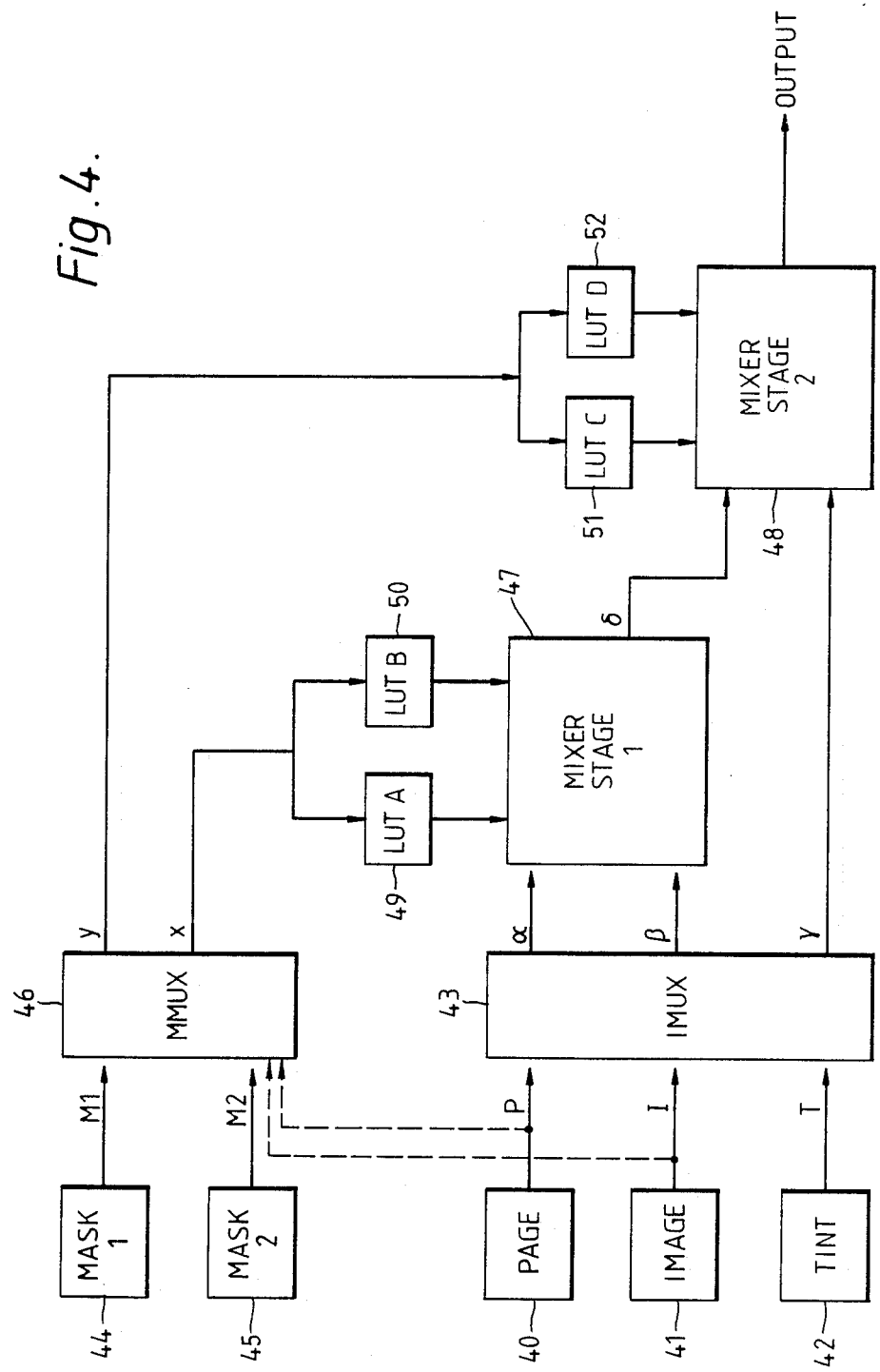
FIG. 4 is a block diagram of a two stage image mixer.

FIG. 4 illustrates one version of the image mixer shown in FIG. 2 comprising just two mixing stages of the form shown in FIG. 3. In the FIG. 4 example, the input ports of the image multiplexer 43 (corresponding to multiplexer 20) are coupled to a page store 40 which generates a page signal P, an image store 41 which generates an image signal I, and a tint store 42 which generates a tint signal T. Each of these stores (which correspond to image stores 7, 21) defines a set of pixels in one-to-one correspondence with the final, composite image. The mask multiplexer 46 (corresponding to multiplexer 26) has two input ports coupled to two mask stores 44, 45 (which correspond to mask stores 15) which generate mask signals M1, M2. Once again, each of these stores 44, 45 defines a set of pixels in one-to-one correspondence with the final composite image.

The image multiplexer 43 has three output ports which generate signals $\alpha$, $\beta$, $\gamma$, while the mask multiplexer 46 has two output ports generating signals x, y. It will be understood that for each multiplexer 43, 46, any of its output ports can be connected with any of its input ports.

The first mixer stage 47 is coupled to the output ports $\alpha$, $\beta$ of the image multiplexer 43 and to the output port x of the mask multiplexer 46. For clarity, the two look-up tables 49, 50 (LUT A, LUT B) have been specifically shown in FIG. 4 separate from the remainder of the mixer stage 47.

The second mixer stage 48 is coupled to the output port $\gamma$ of the image multiplexer 43 and to the output of the first mixer stage 47. In addition, the mixer stage 48 is connected to the output port y of the mask multiplexer 46. Once again, for clarity, the look-up tables 51, 52 (LUT C, LUT D) of the mixer stage 48 have been shown separately.

Each of the look-up tables 49-52 defines a set of mask weighting coefficients which may be represented by functions a(x), b(x), c(y), and d(y) respectively.

To understand how the mixer circuit of FIGS. 3, 4 functions, consider the common requirement to mix a masked image over a page to be responsive to interactive positioning commands from the operator. By masked image, we mean a portion of an image defined by corresponding pixels of a certain value, or range of values, in a mask.

Suppose that the image multiplexer 43 is configured to connect the page store P to output port $\alpha$, and the image store I to output port $\beta$. The mask multiplexer connects the appropriate mask to output port x. The look-up tables A, B are then loaded with functions of the mask value x, that cause the multipliers 30, 32 to weight the page and image signals as required.

In the simple case of a binary (1-bit) mask, x may take only the values of 0 or 1. When x is 0 the page is to be output from the mixer, when x is 1 the image is to be output. The tables are then loaded so that B generates 0 whenever x is 0, and 1 whenever x is 1, and vice versa for A. Thus when x is 0, multiplier 30 passes the page pixel value unchanged to the adder, whereas multiplier 32 outputs 0. When x is 1, the situation is reversed, as multiplier 30 outputs 0, and multiplier 32 passes the image pixel value unchanged to the adder. In this arrangement the mixer circuit acts as a video-rate switch, selecting for each output pixel one or other of its inputs.

In the case of an 8-bit mask, x may take a range of values 0–255. In this case look-up tables A,B are loaded with 8-bit blending functions to achieve a smooth transition from pure page when x=0 to pure image when x=255. Simple functions to achieve this are linear cross-over functions:

$$a(x) = 255 - x) \text{ where } 0 \leq x \leq 255 \quad (2)$$
$$b(x) = x \quad )$$

Non-linear functions, such as logarithmic or trigonometric functions of x, may also be loaded into look-up tables A, B to give different blending effects.

Scrolling of the image can be achieved by controlling the addressing of the image store relative to the raster location on the display monitor, determined by the video synchronising circuitry. If coordinates generated by the operator's digitising hand control are scaled and conveyed to the image scroll address, the effect of mixing the masked image over page as described above will be to see the image moving beneath a stationary mask window in the page. If both image and mask are scrolled in tandem, the effect will be to see a portion of the image moving above the stationary page.

We will now describe some of the novel functions which the apparatus of FIG. 4 can perform. The first function relates to interactive image planning in which the conventional technique of positioning a masked image over a current page is modified to allow some areas of the page to override the masked image. In effect we wish to give the visual effect of moving the masked image below some areas of the page but above other areas. This can be achieved by using the first mask in the store 44 to define the required area of the image, and the second mask stored in the store 45 to define the areas of higher overlays in the page. This results in the masked image appearing to slide between the other image layers in the page.

This function is implemented by controlling the multiplexer 43 to feed the page signal P to two output ports $\alpha$, $\gamma$, thus restoring in the second mixer stage 48 the desired areas of the page that had previously been obscured by the first stage 47. Table 1 below summarises the parameters for this function.

TABLE 1

| MASK | M1 holds image mask |
| --- | --- |
|  | M2 holds overlay feature mask |
| MMUX 46 | Mode 1: M1 → x, M2 → y |
| TINT 42 | Not used |
| LUTs 49–52 | a(x) = 1-x; b(x) = x, c(y) = y, d(y) = 1-y |
| IMUX 43 | P → $\alpha$, I → $\beta$, P → $\gamma$ |

Another function is interactive text planning. Frequently galleys of text need to be planned into a page, independent of the positioning of images. By coupling the tint store or look-up table 42 to the $\gamma$ output port of the image multiplexer 43, text can be mixed over the image/page composite. Note that all three data sets (text, image, page) are held in separate stores and merged in a non-destructive way. Both the text and the image can be positioned independently with respect to the page, and proper anti-aliased text fonts (multiple bits per pixel) can be portrayed. This function is summarised in Table 2 below.

TABLE 2

| MASK | M1 holds image mask, M2 holds text mask |
| --- | --- |
| MMUX 46 | Mode 1: M1 → x, M2 → y |
| TINT 42 | Text colour |
| LUTs 49–52 | a(x) = 1-x; b(x) = x, c(y) = y, d(y) = 1-y |
| IMUX 43 | P → $\alpha$, I → $\beta$, T → $\gamma$ |

Alternatively, if the masked image is to overlay the composite of text and page, the selection multiplexers may be switched so that the text and page are mixed in the first stage, and the image in the second (Table 3).

TABLE 3

| MASK | M1 holds image mask, M2 holds text mask |
| --- | --- |
| MMUX 46 | Mode 2: M1 → y, M2 → x |
| TINT 42 | Text colour |
| LUTs 49–52 | a(x) = 1-x; b(x) = x, c(y) = y, d(y) = 1-y |
| IMUX 43 | P → $\alpha$, T → $\beta$, I → $\gamma$ |

A third variation on the theme is when the text is to overlay the masked image but not extend beyond the mask boundary over the page. Now the text and image must be mixed in the first stage, and the page in the second (Table 4).

TABLE 4

| MASK | M1 holds image mask, M2 holds text mask |
| --- | --- |
| MMUX 46 | Mode 2: M1 → y, M2 → x |
| TINT 42 | T2(m) = Text colour |
| LUTs 49–52 | a(x) = 1-x; b(x) = x, c(y) = 1-y; d(y) = y |
| IMUX 43 | I → $\alpha$, T → $\beta$, P → $\gamma$ |

It is an advantage of this invention that to change from one mixing mode to another, as exemplified by Tables 2–4, no change to the data in the image or mask stores is required. Only the interconnect paths through the two multiplexers need to be changed. This provides a great increase in flexibility of operation, and speed of response to a mode change, over any previous video mixing technique.

A further function which can be achieved is unsharp masking. In this case, LUT 49 is loaded with the unsharp masking constant K and the LUT 40 with unity. The original image is held in the page store 40 and the store 41 stores for each pixel the value S−U as defined by equation (1). The multiplexer 43 feeds the values from the store 40 to output $\alpha$ and from store 41 to output $\beta$ where mixing takes place under control the contents of the LUTs 49, 50. The output $\delta$ from the mixer stage 47 will be defined as:

$$S + K(S - U) \text{ following equation (1)}.$$

If desired, this output $\delta$ can be fed directly through the mixer stage 48 without further change. The operator can vary the amount of unsharp masking over the entire image simply by varying the value of K stored in the LUT 49 interactively.

It is possible to achieve localised unsharp masking by making use of a suitable mask in one of the mask stores controlling the second mixer stage 48. In this modification, the LUT 51 is loaded with values 1−y and the LUT 52 with values y. The image in the store 40 is also fed by the multiplexer 43 to the output $\gamma$ so that the output from the mixer stage 48 has the form:

$$yS+(1-y)S' \qquad (3)$$

An extension of the invention for interactive image colour correction can be achieved by providing an additional data path from the image store 41 to the input of the mask multiplexer 46 (shown by a dashed line in FIG. 4). By routing this data to the first stage mixer 47, and filling LUT A 49 with the desired colour correction function a(X), and selecting a tint value of 1 (unity) from register 42 via image multiplexer 43 to input α of mixer 47, and loading LUT B 50 with 0 (zero), the output 8 of mixer 47 will be simply the corrected image data. This can then be combined selectively with the original image, in an area defined by a mask, in the second mixer 48, as described above for USM.

The system described benefits from the fact that all operations mixing, scrolling etc. are non-destructive. That is to say that the data stores 40, 41, 42, 44 and 45 are not modified in any way to achieve the desired video image composition. This allows successive modification to the video displays always to be derived from the original source image data. There is however a requirement to store the resultant composite image. For example, if an operator has decided on a particular mix of images he will want to "save" the composite image possibly to the disc store 4 on the host computer 1.

A grab-back facility may therefore be included which enables the data presented at the output of the image mixer to be stored in a selected image store. This image store must of course be one that is not being used as a source image and so a non-viewable store may be provided for this purpose. The grab-back facility is particularly powerful since it harnesses the processing power of the mixing system. When successive mixing operations are carried out the page store can be successively updated with the grab-back image. Thus in the example of page planning a number of images can be rapidly mixed into a composite page.

We claim:

1. Apparatus for generating a composite image from a plurality of subsidiary images, the apparatus comprising:

first storage means for storing signals representing at least two subsidiary images;

second storage means for storing at least two arrays of mask data, each array having a mask pixel corresponding to each pixel of the composite image; and control means responsive to each array of mask data to generate for the pixels of the composite image signals defining a weighted sum of the subsidiary images, wherein the control means includes a number of image mixing stages connected in cascade, each of which is associated with a mask data array, each stage downstream of the first combining two input pixel signals, one from the output of the previous stage and the other from a subsidiary image in the first storage means.

2. Apparatus according to claim 1, wherein the subsidiary images comprise one or more of an image, a current version of the composite page, text or line work, a tint, and a computer-generated picture.

3. Apparatus according to claim 1, wherein the control means further comprises a first multiplexer which has one input port for each subsidiary image and one output port for each mixing stage plus one additional output port connected to the first mixing stage.

4. Apparatus according to claim 1, wherein each mixing stage includes a weighting circuit comprising a number of look-up tables which are addressed by the mask data to generate mask weighting coefficients.

5. Apparatus according to claim 4, wherein the control means further includes a second multiplexer having a number of input ports, one for each array of mask data, and which is controllable to allow any of the mask data arrays to be selected to address the look-up tables in each weighting circuit.

6. Apparatus according to claim 4, wherein each weighting circuit comprises two look-up tables which hold weighting coefficients, the control means being arranged to multiply each input image pixel value by the respective weighting coefficient, to add the products together, and to normalise the resultant sum to give a composite output pixel value.

7. Apparatus according to claim 4, wherein the second multiplexer has an additional input port for each image store and is controllable to allow any of the mask data arrays or image data arrays to be selected to address the look-up tables in each weighting circuit.

* * * * *